(12) United States Patent
Betz et al.

(10) Patent No.: US 8,577,726 B1
(45) Date of Patent: Nov. 5, 2013

(54) CALCULATING BID AMOUNTS BASED ON CATEGORY-SPECIFIC ADVERTISING EXPENSE FACTORS AND CONVERSION INFORMATION

(75) Inventors: Stephan G. Betz, Seattle, WA (US); John Todd Larason, Renton, WA (US)

(73) Assignee: Amazon Technologies, Inc., Reno, NV (US)

( * ) Notice: Subject to any disclaimer, the term of this patent is extended or adjusted under 35 U.S.C. 154(b) by 1580 days.

(21) Appl. No.: 11/743,807

(22) Filed: May 3, 2007

(51) Int. Cl.
*G06Q 30/00* (2012.01)

(52) U.S. Cl.
USPC .................................................. 705/14.69

(58) Field of Classification Search
USPC ...................................................... 705/14, 26
See application file for complete search history.

(56) References Cited

U.S. PATENT DOCUMENTS

| | | | |
|---|---|---|---|
| 2005/0137939 A1* | 6/2005 | Calabria et al. | 705/26 |
| 2005/0149390 A1 | 7/2005 | Scholl et al. | |
| 2006/0173744 A1* | 8/2006 | Kandasamy et al. | 705/14 |
| 2006/0184421 A1* | 8/2006 | Lipsky et al. | 705/14 |
| 2007/0067215 A1* | 3/2007 | Agarwal et al. | 705/14 |

* cited by examiner

*Primary Examiner* — Saba Dagnew
(74) *Attorney, Agent, or Firm* — Novak Druce Connolly Bove + Quigg LLP

(57) ABSTRACT

A calculate bid system calculates bid amounts based on category-specific conversion information and category-specific advertising expense factors. The calculate bid system collects conversion information for keywords used in advertisements for categories of items purchased during converting sessions. The calculate bid system uses collected category-specific conversion information along with category-specific advertising expense factors to calculate a bid amount for a keyword. The calculate bid system may calculate a bid amount by generating a product for each category of the financial benefit for the category multiplied by the advertising expense factor for that category. The calculate bid system may then aggregate the products and normalize the aggregated product by dividing by a collected number of conversions. The calculate bid system may then multiply the normalized aggregated product by a forecast conversion rate to give the bid amount.

32 Claims, 6 Drawing Sheets rate table 113

| category | AEF | FCR |
|----------|-----|-----|
| books | 17% | 10% |
| CDs | 10% | 20% |
| ⋮ | ⋮ | |
| games | 5% | 20% |

*FIG. 3*

CALCULATING BID AMOUNTS BASED ON CATEGORY-SPECIFIC ADVERTISING EXPENSE FACTORS AND CONVERSION INFORMATION

TECHNICAL FIELD

The described technology relates generally to calculating bid amounts for advertisements that are keyword-targeted.

BACKGROUND

Many search engine services, such as Google, Yahoo! and MSN, provide for searching for information that is accessible via the Internet. These search engine services allow users to search for web pages and other Internet-accessible resources that may be of interest to users. After a user submits a search request that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. Some search engine services can even search information sources that are not accessible via the Internet. For example, a book publisher may make the content of its books available to a search engine service. The search engine may generate a mapping between the keywords and books. When a search engine service receives a search request that includes one or more search terms, it uses its mapping to identify those information sources (e.g., web pages or books) whose keywords most closely match the search terms. The collection of information sources that most closely matches the search terms is referred to as the "search result." The search engine service then ranks the information sources of the search result based on the closeness of each match, web page popularity (e.g., Google's page ranking), and so on. The search engine service then displays to the user links to those information sources in an order that is based on their rankings.

Some search engine services do not charge a fee to the providers of web pages for including links to their web pages in search results. Rather, the search engine services obtain revenue by placing advertisements along with search results. These paid-for advertisements are commonly referred to as "sponsored links," "sponsored matches," or "paid-for search results." A vendor who wants to place an advertisement along with certain search results provides a search engine service with an advertisement and search terms. When a search request is received, the search engine service identifies the advertisements whose search terms match those of the search request. The search engine service then may display some of the advertisements along with the search results. If more advertisements are identified than will fit on the first page of the search results, the search engine service may select to display on the first page advertisements based on some criterion such as bid amount. In general, a search engine service or other advertisement placement service will display advertisements with higher bid amounts more prominently. For example, a list of sponsored links may be ordered by bid amount, the advertisement with the highest bid amount may be displayed in a prominent location (e.g., top of a web page), an advertisement with a high bid amount may be highlighted, and so on. The search engine services can either charge for placement of each advertisement along with search results (i.e., cost per impression) or charge only when a user actually selects a link associated with an advertisement (i.e., cost per click).

A web site provider may place advertisements for the web site with order placement services such as search engine services. As an advertiser, the provider of a web site would like to maximize the effectiveness of advertising dollars used to pay for advertisements. Thus, advertisers try to identify keyword and advertisement combinations that result in the highest benefits (e.g., most profit) to the advertiser. Many techniques have been developed to identify keywords that may be appropriate for advertising various items. For example, some techniques analyze "clickthrough logs" to identify keywords of search requests submitted by users and the items of sponsored links that the users selected. If many search requests with a common keyword result in users selecting sponsored links for the same item, then a vendor may want to place an advertisement for that item or for the category (e.g., DVDs and books) of that item with results of search requests that contain that search term.

Some techniques also select search terms based on a "conversion rate" for a search term and an item. A conversion rate may measure the percentage of clickthroughs to the item resulting in an actual purchase of an item. Conversion rate, however, is more generally the percentage of clickthroughs that result in some desirable benefit to a vendor or an organization. For example, the conversion rate for an insurance company may be a measure of the percentage of clickthroughs that result in the user requesting a rate quote.

To maximize the effectiveness of their advertising dollars, advertisers may use various techniques to determine the bid amount for a particular keyword. An advertiser may want to place an advertisement in a less prominent position on the first page of a search result, rather than a more prominent position on the first page, under the assumption that the additional cost for the more prominent position outweighs its benefit. If the advertisement is placed in a more prominent position, then the advertiser is bidding too much and the advertiser's advertising expenses will increase. In contrast, if the advertisement is placed on the second page, rather than the first page, the advertiser is not bidding high enough. In such a case, because only a few users may actually see and select the advertisement, the advertiser may lose profitable sales that might have been made if the bid amount had been only slightly higher.

One technique for determining the bid amount for a keyword factors in a forecasted conversion rate, average revenue from a sale, and an advertising expenditure as a percentage of revenue. As an example, the average sale price for conversions initiated by selecting advertisements displayed based on queries that included the keyword may be $20. Also, an advertiser may want to allocate 5% of revenue for advertising expenses, and the forecasted conversion rate may be 10%. The advertiser may calculate the bid amount by multiplying the average sale price by the advertising expenditure percentage by the forecasted conversion rate to give a bid amount of $0.10 (i.e., $20*5%*10%) in this example.

Since the profitability of different categories of products may vary greatly, an advertiser may want to use different advertising expenditure percentages for different categories. For example, the profit margin on video games may be higher than the profit margin on DVDs. If so, an advertiser may want to use an advertising expense percentage of 10% for video games, but only 5% for DVDs. When an advertiser submits an advertisement for a product in a certain category or a category of products for a keyword, the advertiser uses the advertising expense percentage for that category to calculate the bid amount.

A difficulty with such an approach is that users who select the advertisement to initiate a session with the advertiser may purchase products in categories very different from the category of the advertisement. For example, a user interested in a Pokémon DVD may enter a query that includes the keyword of "Pokémon." If the advertiser calculated the bid amount for the keyword "Pokémon" based on the video game category, then the advertiser will have bid too much for the keyword that leads to a DVD sale. In contrast, if the user was actually interested in a video game, but the advertiser submitted a bid based on the DVD category, then the advertiser would be bidding less than desired for advertisements that lead to a video game sale. As a result, the advertisement may not be placed prominently (as other advertisers may be bidding higher amounts) and potential profitable sales may be lost.

SUMMARY

This disclosure relates generally to generating advertisement sets. For example, an embodiment of a method and system for generating advertisement sets with bid amounts using category-specific advertising expense factors and category-specific conversion information for keywords is provided. According to such embodiments, the calculate bid system calculates bid amounts based on category-specific conversion information and category-specific advertising expense factors. A calculate bid system collects conversion information for keywords used in advertisements for categories of items purchased during converting sessions. The conversion information may include a number of conversions for a keyword along with the financial benefit of the conversions for each category of items purchased. The calculate bid system uses the collected category-specific conversion information along with category-specific advertising expense factors to calculate a bid amount for a keyword. The calculate bid system may calculate a bid amount by generating a product for each category of the financial benefit for the category multiplied by the advertising expense factor for that category. The calculate bid system then aggregates the products and normalizes the aggregated product by dividing by the number of conversions. The calculate bid system then multiplies the normalized aggregated product by a forecast conversion rate to give the bid amount.

Other systems, methods, features, and/or advantages will be or may become apparent to one with skill in the art upon examination of the following drawings and detailed description. It is intended that all such additional systems, methods, features, and/or advantages be included within this description and be protected by the accompanying claims.

BRIEF DESCRIPTION OF THE DRAWINGS

FIG. 3 is a block diagram that illustrates a logical organization of the rate table of the calculate bid system in one embodiment.

DETAILED DESCRIPTION

Figure 1:
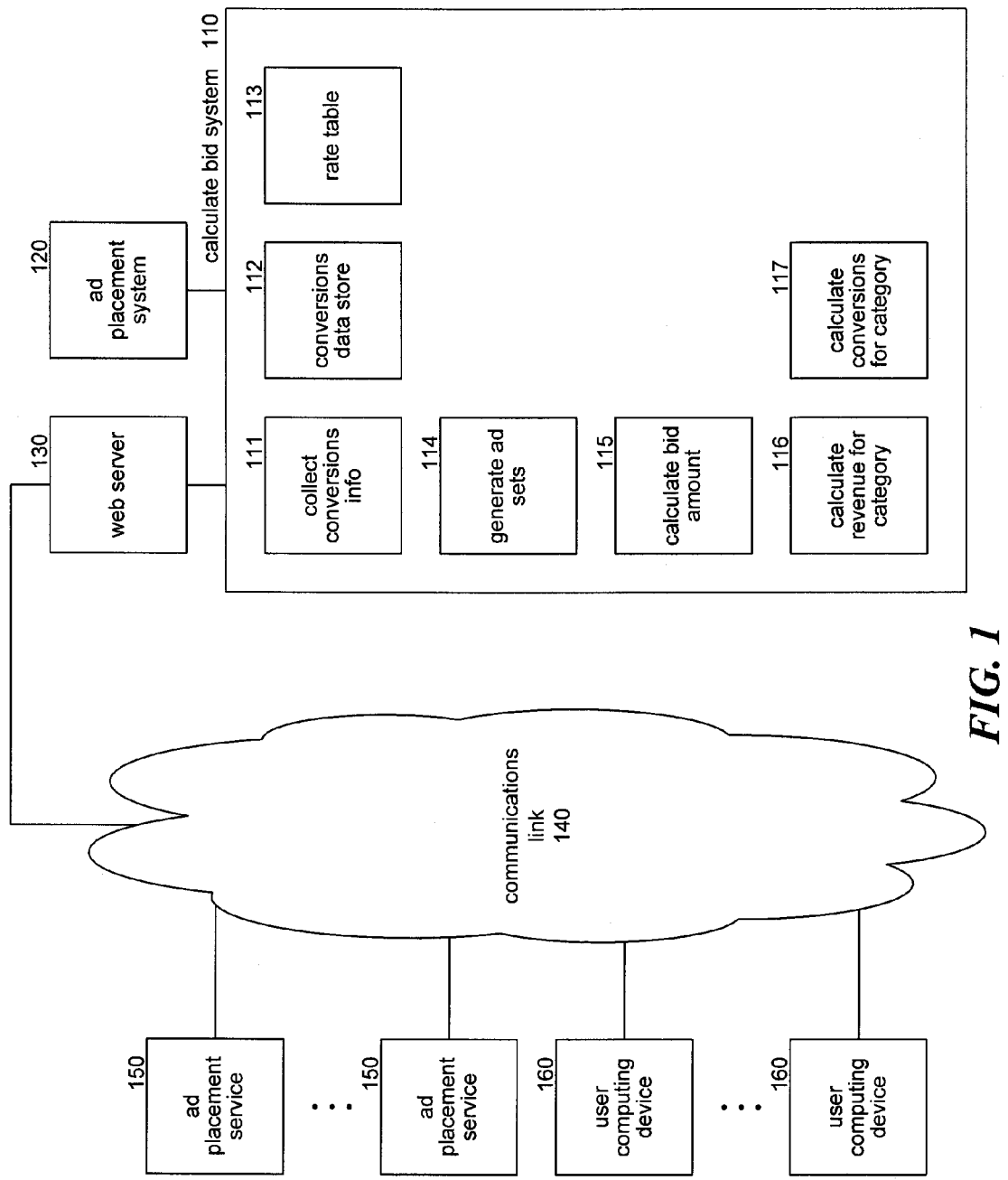
FIG. 1 is a block diagram that illustrates components of the calculate bid system in one embodiment.

A method and system for generating advertisement sets with bid amounts using category-specific advertising expense factors and category-specific conversion information for keywords is provided. In one embodiment, a calculate bid system is implemented as part of an advertisement placement system that includes multiple advertisement generators that automatically create advertisement sets. An advertisement set contains an advertisement, a search term or keyword, and/or a link to advertised item(s). Different advertisement generators use different algorithms to automatically generate (or "create") advertisements (also referred to as the "creative"), identify search terms, and/or create links to form advertisement sets. The advertisement placement system may include an advertisement manager that receives advertisement sets from the advertisement generators, identifies a fee or bid amount to be associated with each advertisement set, and selects which advertisement sets are to be submitted to various advertisement placement services (e.g., search engine services or other contextual advertising that places advertisements that correspond to keywords in a search request, text of the content of a web page, text of a discussion thread, and so on). Advertisement sets may be automatically generated and automatically placed with advertisement placement services to help achieve an advertiser's objectives. An advertisement placement system is described in U.S. patent application Ser. No. 10/748,759, entitled "Method and System for Generating Keyword-Targeted Advertisements," which is hereby incorporated by reference.

The calculate bid system calculates bid amounts based on category-specific conversion information and category-specific advertising expense factors. In some embodiments, the calculate bid system collects conversion information for keywords used in advertisements for categories of items purchased during converting sessions. The conversion information may include number of conversions for a keyword along with the financial benefit (e.g., revenue and profits) of the conversions for each category of items purchased. For example, the calculate bid system may collect for a keyword "Pokémon" conversion information indicating that advertisements placed using the keyword Pokémon resulted in 200 conversions with revenues of $3000 from items purchased in the video game category and revenues of $2000 from items purchased in the DVD category. The calculate bid system uses the collected category-specific conversion information along with category-specific advertising expense factors to calculate a bid amount for a keyword. For example, the category-specific advertising expense factor may be 10% for the video game category and 5% for the DVD category. The calculate bid system calculates a bid amount by generating a product for each category of the financial benefit for the category multiplied by the advertising expense factor for that category. For example, the calculate bid system may calculate the product of $300 (i.e., $3000*10%) for the video game category and the product of $100 (i.e., $2000*5%) for the DVD category. The calculate bid system then aggregates the products. Continuing with the example, the aggregation of the products would be $400 (i.e., $300+$100). The calculate bid system then normalizes the aggregated product by dividing by the number of conversions. Continuing with the example, the normalized aggregated product is $2 (i.e., $400/200). The calculate bid system then multiplies the normalized aggregated product by a forecast conversion rate to give the bid amount. Continuing with the example, if the forecast conversion rate is 10%, then the calculate bid system would calculate a bid amount of $0.20 (i.e., $2*10%). The calculate bid system thus determines the bid amount for a keyword based on an aggregation of a combination of a historical financial benefit for each category derived from advertisements placed with a keyword and a category-specific expense factor for each category. One skilled in the art will appreciate that the category-specific financial benefits and expense factors may be combined in various ways to generate a bid amount for a keyword.

In some embodiments, the calculate bid system collects the conversion information for conversions that occur over a period of time and can weight particular periods of time heavier than others when calculating bid amounts. For example, the period of time may be one month, six months, one year, or multiple years. Because, in some cases, more recent, rather than less recent, conversion information for a keyword is likely to be more representative of the value of that keyword, the calculate bid system decreases the influence over time of conversion information on the calculated bid amount. For example, the calculate bid system may decrease the influence either linearly or non-linearly over time. To decrease the influence linearly for a year of conversion information, the calculate bid system may reduce the influence of conversion information that is 12 months old to $1/12^{th}$, that is 11 months old to $2/12^{th}$, . . . , and that is 1 month old to $11/12^{th}$, but not reduce the influence of conversion information for the current month. To decrease the influence non-linearly (e.g., exponentially), the calculate bid system may decrease the influence of conversion information by 50% for each time period. In other words, the influence of the conversion information for the current month is not decreased, one month in the past is decreased to 50%, two months in the past is decreased to 25%, and so. One skilled in the art will appreciate that there are many different techniques to decrease (e.g., decay factors) the influence of conversion information over time. In other embodiments, less recent periods can be weighted more heavily than more recent periods. For example, it may be advantageous to adjust weights around periodic events (e.g., Christmas, Easter, summer, and winter).

In some embodiments, the calculate bid system allows the category-specific advertising expense factor to be dynamically modified. The calculate bid system may maintain a table that contains an advertising expense factor for each category. Whenever the calculate bid system calculates a bid, it retrieves the advertising expense factors from the table. The calculate bid system allows an administrator to change the advertising expense factors of the table. When the calculate bid system next calculates the bid, it uses the changed advertising expense factors.

In some embodiments, the calculate bid system uses a category-specific forecast conversion rate for each category. For example, the forecast conversion rate for the category of video games may be 10%, and the forecast conversion rate for the category of DVDs may be 15%. The calculate bid system may then multiply the product of the financial benefit and the advertising expense factor for a category by the forecast conversion rate for that category before aggregating the products. When the aggregated product is then normalized, the quotient will then represent the calculated bid amount.

The calculation of the bid amount by the calculate bid system may be represented as follows:

$$B = \frac{\sum_{i=1}^{n} FB_i * AEF_i}{C} * FCR \quad (1)$$

where B represents the bid amount, $FB_i$ represents the financial benefit for the category i, $AEF_i$ represents the advertising expense factor for category n represents the number of categories, C represents the number of conversions, and FCR represents the forecasted conversion rate. The calculation of the bid amount using a decay factor that decreases the influence of the financial benefit over time may be represented as follows:

$$B = \left( \sum_{t=1}^{m} \frac{\sum_{i=1}^{n} FB_i^t * AEF_i^t}{C^t} \right) * FCR \quad (2)$$

where $FB_i^t$ represents the financial benefit for category i at time t, $C^t$ represents the number of conversions for time t, and $B_i$ represents the decay factor for time t (which decreases over time). The calculation of the bid amount using a category-specific forecasted conversion rate may be represented by the following:

$$B = \frac{\sum_{i=1}^{n} FB_i * AEF_i * FCR_i}{C} \quad (3)$$

where $FCR_i$ represents the forecasted conversion rate for category i.

FIG. 1 is a block diagram that illustrates components of the calculate bid system in one embodiment. The calculate bid system 110 is connected to an advertisement placement system 120 and a web server 130. The web server 130 is connected to user computing devices 160 via a communications link 140. Users at the user computing devices 160 access web pages of advertisement placement services 150. When a user selects an advertisement of the web server 130, the user is presented with a web page generated by web server 130. The selection of the advertisement initiates a session with the web server 130 based on the keyword associated with the advertisement. The web server 130 logs information relating to the session including categories of items purchased during the session and the financial benefit for each category. Alternatively, the web server 130 may simply add an entry to a web log for each interaction with a user computing device 160. The calculate bid system 110 can then analyze the web log to identify the sessions, the categories of items purchased, and the financial benefit of each purchase. After advertisement sets are generated with bid amounts calculated by the calculate bid system, the advertisement sets are submitted to the advertisement placement system 120. The advertisement placement system 120 in turn submits the advertisement sets to an advertisement placement service 150 via the communications link 140.

The calculate bid system 110 includes a collect conversions information component 111, a conversions data store 112, and a rate table 113. The collect conversions information component 111 collects conversion information from the web server 130 and stores the conversion information in the conversions data store 112. The rate table 113 contains an entry for each category that includes a category-specific advertising expense factor and optionally a category-specific forecasted conversion rate.

The calculate bid system 110 also includes a generate advertisement sets component 114 that generates advertisement sets that include an advertisement, a keyword, and a bid amount. The generate advertisement sets component 114 invokes a calculate bid amount component 115 to calculate a bid amount for an advertisement set. The calculate bid amount component 115 invokes a calculate revenue for category component 116 and a calculate conversions for category component 117 to calculate a bid amount based on category-specific advertising expense factors and category-specific financial benefit for the keyword of the advertisement set.

Figure 2:
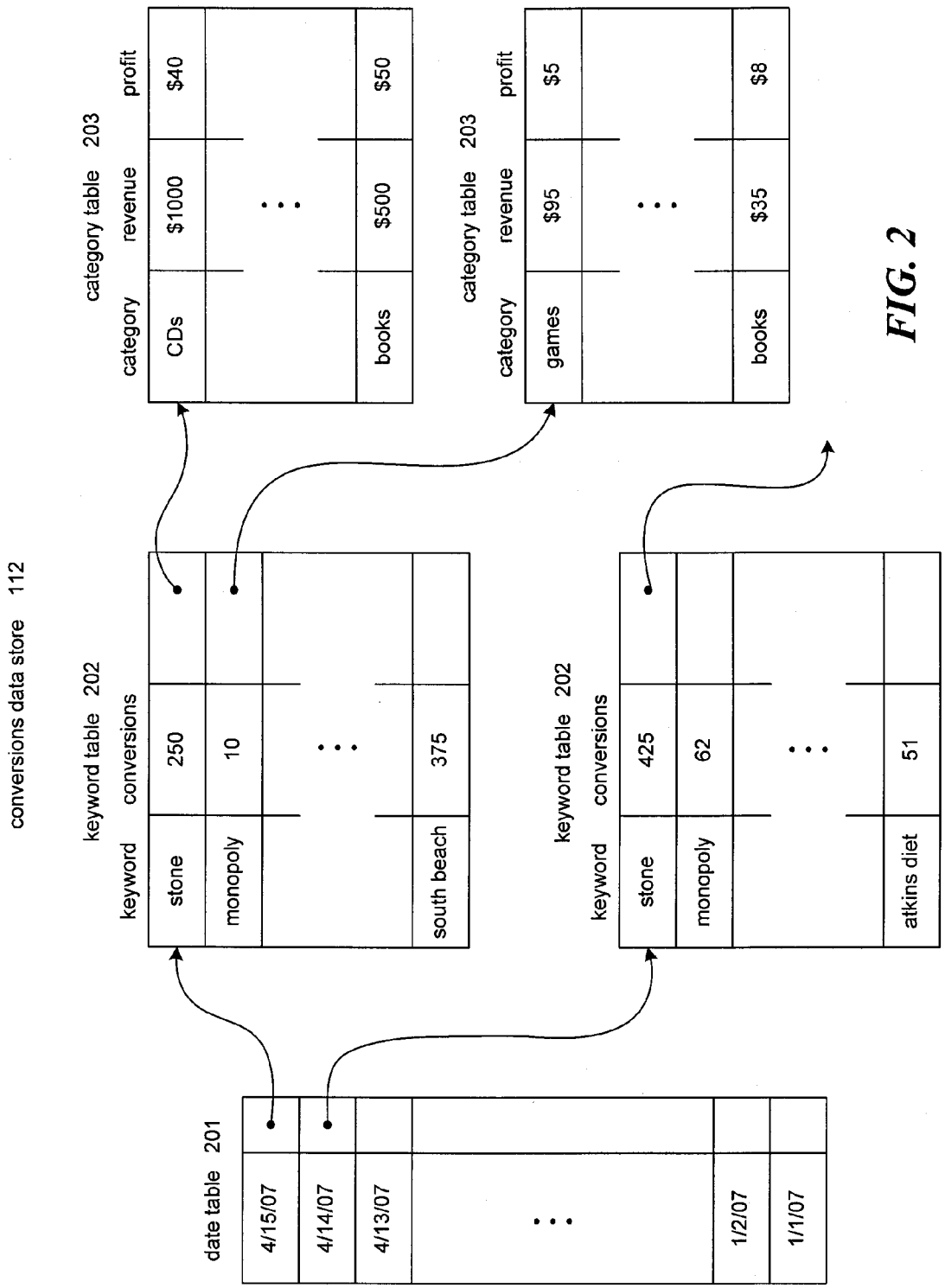
FIG. 2 is a block diagram that illustrates a logical organization of the conversions data store of the calculate bid system in one embodiment.

FIG. 2 is a block diagram that illustrates a logical organization of the conversions data store 112 of the calculate bid system 110 in one embodiment. The conversions data store 112 includes a date table 201 with an entry for each date for which conversion information has been collected. One skilled in the art will appreciate that each entry may correspond to time periods of varying length such as multiple dates (e.g., a week) or portions of a date (e.g., six-hour increments). Each entry identifies the corresponding date and contains a reference to a keyword table 202. A keyword table 202 contains an entry for each keyword of an advertisement set whose advertisement was selected by a user and resulted in a conversion. Each entry of a keyword table 202 contains the keyword, number of conversions for the corresponding date, and a reference to a category table 203 for that keyword. A category table 203 contains an entry for each category of items purchased during converting sessions initiated when a user selected an advertisement of an advertisement set with the keyword of the referring entry of the keyword table 202. Each entry of a category table 203 identifies the category and a financial benefit for that category such as revenue and/or profit. For example, the date table 201 has an entry for Apr. 15, 2007 that references a keyword table 202. The referenced keyword table 202 contains an entry for each keyword, such as "stone," "monopoly," and "south beach." The entry for the keyword "stone" indicates that there were 250 conversions on Apr. 15, 2007 and contains a reference to a category table 203. The referenced category table 203 contains an entry for each category, such as CDs and books. Each entry indicates the revenue and profits associated with that category for the keyword "stone" for Apr. 15, 2007. For example, the entry for the CD category indicates a revenue of $1000 and a profit of $40. One skilled in the art will appreciate that the conversion information of the conversion data store 112 and other data of the calculate bid system may be stored using various data structures such as hash tables, trees, inverted files, linked lists, and so on.

FIG. 3 is a block diagram that illustrates a logical organization of the rate table 113 of the calculate bid system 110 in one embodiment. The rate table 113 contains an entry for each category of items that may be purchased via the web server 130. Each entry contains an advertising expense factor and a forecasted conversion rate for the category. For example, the entry for the books category contains an advertising expense factor of 17% and a forecasted conversion rate of 10%.

The computing devices on which the calculate bid system 110 may be implemented may include, among other components, a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the functions of the system. In addition, the instructions, data structures, and message structures may be stored or transmitted via a data transmission medium, such as a signal on a communications link 140. Various communications links 140 may be used, such as the Internet, a local area network, a wide area network, or a point-to-point dial-up connection. The system may be implemented on various computing systems or devices including personal computers, server computers, multiprocessor systems, microprocessor-based systems, network PCs, minicomputers, mainframe computers, distributed computing environments that include any of the above systems or devices, and the like.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. The functionality of the components of the system in this description is described to help facilitate an understanding of the system. For example, the calculate bid system 110, the advertisement placement system 120, and the web server 130 may execute on the same or different computer systems.

Figure 4:
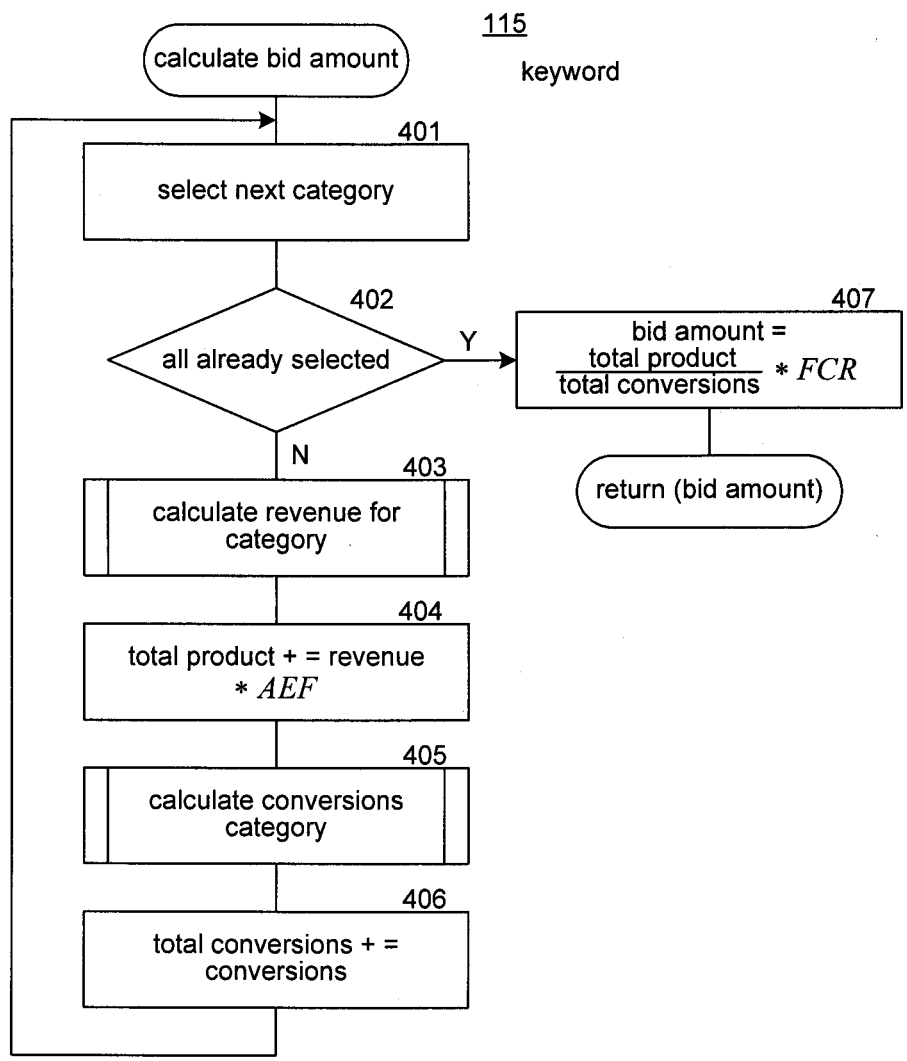
FIG. 4 is a flow diagram that illustrates the processing of the calculate bid amount component of the calculate bid system in one embodiment.

FIG. 4 is a flow diagram that illustrates the processing of the calculate bid amount component 115 of the calculate bid system 110 in one embodiment. The component is passed a keyword and calculates a bid amount for that keyword based on category-specific advertising expense factors and category-specific financial benefits. In blocks 401-406, the component loops selecting each category and aggregating the products of the category-specific revenues and category-specific advertising expense factors for each category and accumulating the conversions for each category. In block 401, the component selects the next category. In decision block 402, if all the categories have already been selected, then the component continues at block 407, else the component continues at block 403. In block 403, the component invokes the calculate revenue for category component 116 to calculate the revenue for the selected category and the passed keyword. In block 404, the component accumulates the product of the revenue and the category-specific advertising expense factor retrieved from the rate table 113. In block 405, the component invokes the calculate conversions for category component 117 to calculate the conversions for the selected category for the passed keyword. In block 406, the component accumulates the total number of conversions for all categories. The component then loops to block 401 to select the next category. In block 407, the component calculates the bid amount by normalizing the total product by the total conversions and multiplying that quotient by the forecasted conversion rate. The component then returns the bid amount.

Figure 5:
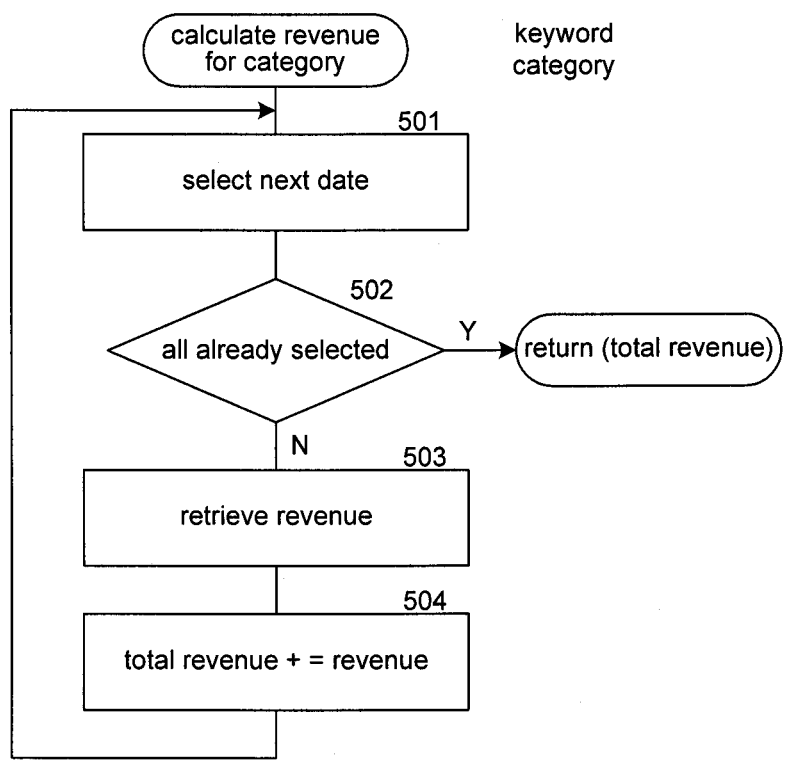
FIG. 5 is a flow diagram that illustrates the processing of the calculate revenue for category component of the calculate bid system in one embodiment.

FIG. 5 is a flow diagram that illustrates the processing of the calculate revenue for category component 116 of the calculate bid system 110 in one embodiment. The component is passed a keyword and a category and calculates the revenue for the passed keyword and category. In blocks 501-504, the component loops retrieving the revenue for each date and accumulating the revenue. In block 501, the component selects the next date of the date table 201. In decision block 502, if all the dates have already been selected, then the component returns the total revenue, else the component continues at block 503. In block 503, the component retrieves the revenue for the passed category and keyword from the category table 203. To retrieve the revenue, the component selects the entry of the keyword table 202 for the selected date and the passed keyword and retrieves the reference to the category table 203. The component then retrieves the entry from the referenced category table 203 corresponding to the passed category and retrieves the revenue from that entry. In block 504, the component accumulates the revenue into the total revenue for the passed keyword and category across all dates and then loops to block 501 to select the next date.

Figure 6:
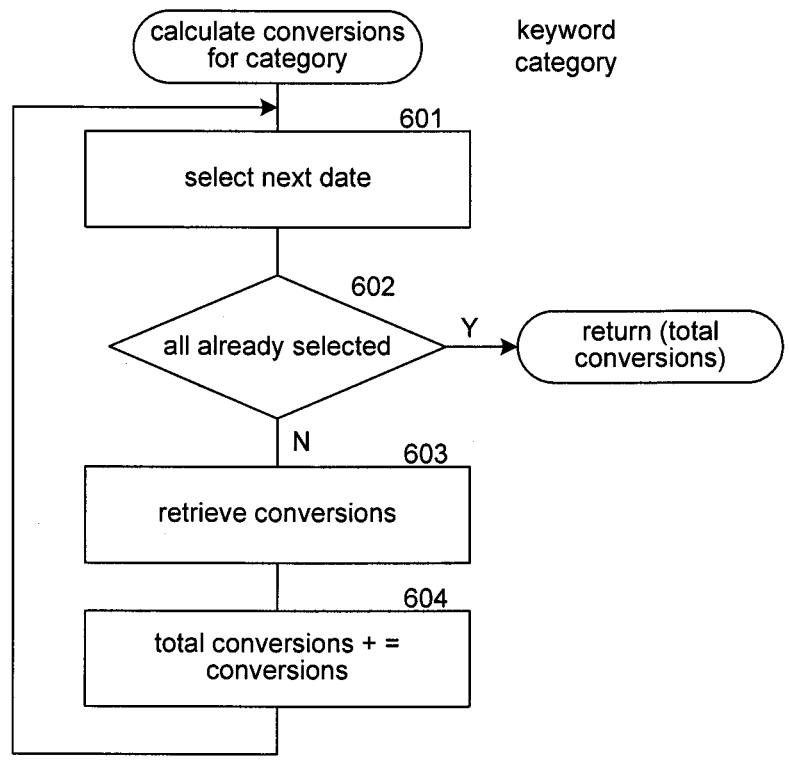
FIG. 6 is a flow diagram that illustrates the processing of the calculate conversions for category component of the calculate bid system in one embodiment.

FIG. 6 is a flow diagram that illustrates the processing of the calculate conversions for category component 117 of the calculate bid system 110 in one embodiment. The component is passed a keyword and a category and accumulates the number of conversions for the passed keyword and category across all dates. In block 601, the component selects the next entry of the date table 201. In decision block 602, if all the entries of the date table 201 have already been selected, then the component returns the total conversions, else the component continues at block 603. In block 603, the component retrieves an entry corresponding to the passed keyword from the keyword table 202 referenced by the selected entry of the date table 201. The component then retrieves the conversions from the entry of the keyword table 202. In block 604, the component accumulates the total conversions and then loops to block 601 to select the next entry of the date table 201.

One skilled in the art will appreciate that although specific embodiments of the calculate bid system 110 have been described herein for purposes of illustration, various modifications may be made without deviating from the spirit and scope of the invention. The term "item" includes any product, service, or concept that can be advertised. A pseudo-revenue may be associated with items that are not purchased. For example, if during a session a user signs up to receive product availability alerts, a web server may assign a value to that session even though no money is actually received during the session. Accordingly, the invention is not limited except as by the appended claims.

At least the following is claimed:

1. A method in a computing device for generating advertisement sets, each advertisement set having a keyword, an advertisement, and a bid amount, the method comprising:
   collecting, at one or more computer systems, conversion information for each keyword for at least one period of time, the conversion information including a number of conversions for that keyword for the at least one period of time and, for each category of conversion, revenue for that category from the conversions for that keyword for the at least one period of time;
   generating, at the one or more computer systems, an advertisement for an advertisement set for a target keyword;
   determining, at the one or more computer systems, a category-specific advertising expense factor for each category of a conversion;
   calculating, at the one or more computer systems, a category-specific product for each category for the target keyword, the category-specific product calculated by multiplying the revenue for the target keyword for the category by the category-specific advertising expense factor determined for the category;
   performing, at the one or more computer systems, a summation of the calculated category-specific products;
   generating, at the one or more computer systems, a quotient by dividing the summation by a number of conversions for the target keyword;
   multiplying, at the one or more computer systems, the quotient by a forecast conversion rate, the forecast conversion rate comprising a predicted percentage of clickthroughs associated with the keyword that results in a conversion, to generate a bid amount for the advertisement set; and
   submitting, at the one or more computer systems, the advertisement set with the target keyword, the generated advertisement, and the calculated bid amount to an advertisement placement system.

2. A method in a computing device for calculating a bid amount for a keyword, the method comprising:
   collecting, at one or more computer systems, conversion information for the keyword indicating financial benefit resulting from users selecting advertisements displayed with content that relates to the keyword, the financial benefit being organized into categories;
   determining, at the one or more computer systems, a category-specific advertising expense factor for each category;
   calculating, at the one or more computer systems, a category-specific product for each category, the category specific product calculated by multiplying the financial benefit for the category by the category-specific advertising expense factor determined for the category;
   generating, at the one or more computer systems, a summation of the calculated category-specific products;
   generating, at the one or more computer systems, a quotient, wherein the quotient is the summation of the category-specific products divided by a number of sessions with financial benefit; and
   generating, at the one or more computer systems, a bid amount for the keyword based at least in part on the quotient multiplied by a forecast conversion rate, the forecast conversion rate comprising a predicted percentage of clickthroughs associated with the keyword that results in a conversion.

3. The method of claim 2 wherein the financial benefit is revenue generated from purchases of items within a category during a session initiated with the selection of an advertisement for the keyword and the category-specific advertising expense factor is a percent of revenue to be spent on advertising for the category of the purchased item.

4. The method of claim 2 wherein the financial benefit is profit generated from purchases of items within a category during a session initiated with the selection of an advertisement for the keyword and the category-specific advertising expense factor is a percent of profit to be spent on advertising for the category of the purchased item.

5. The method of claim 2 wherein the financial benefit is generated from purchases of items within a category during a session initiated with the selection of an advertisement for the keyword and the determining of the bid amount includes accumulating combinations for each category of the financial benefit for that category and the category-specific advertising expense factor for that category and normalizing the accumulated combinations by number of sessions resulting in the financial benefit.

6. The method of claim 5 wherein the determining of the bid amount includes multiplying the normalized accumulated combinations by a forecast conversion rate.

7. The method of claim 5 wherein the determining of the bid amount includes further multiplying the combination for a category by a category-specific forecast conversion rate before accumulating the combinations.

8. The method of claim 2 wherein the financial benefit has an associated time and the influence of the financial benefit on the determined bid amount decreases over time.

9. The method of claim 2 wherein the category-specific advertising expense factor is dynamically changed.

10. The method of claim 2 wherein the collecting of conversion information also includes collecting number of conversions, a conversion being a session initiated by selection of an advertisement placed based at least in part on the keyword and resulting in financial benefit.

11. The method of claim 2 including generating an advertisement set that includes the keyword, an advertisement, and the determined bid amount.

12. The method of claim 11 including submitting the generated advertisement set to an advertisement placement system.

13. The method of claim 2 wherein the content is results of a query that includes the keyword.

14. The method of claim 2 wherein the content is text of a web page that relates to the keyword.

15. A non-transitory computer-readable storage medium encoded with instructions for controlling a computing device to calculate a bid amount for a keyword, by a method comprising:
  collecting conversion information for the keyword indicating financial benefit resulting from users selecting advertisements displayed with content that relates to the keyword, the financial benefit being organized into categories relating to sessions initiated by the selecting of the advertisements;
  determining a category-specific advertising expense factor for each category;
  calculating a category-specific product for each category, the category-specific product calculated by multiplying the financial benefit for the category by the category-specific advertising expense factor determined for the category; and
  generating a bid amount for the keyword based at least in part on a quotient of an aggregation of the category-specific products divided by number of sessions with financial benefit multiplied by a forecast conversion comprising a predicted percentage of clickthroughs associated with the keyword that result in financial benefit.

16. The non-transitory computer-readable storage medium of claim 15 wherein the financial benefit is revenue generated from purchases of items and the category-specific advertising expense factor is a percent of revenue to be spent on advertising for the categories of the purchased items.

17. The non-transitory computer-readable storage medium of claim 15 wherein the financial benefit is profit generated from purchases of items and the category-specific advertising expense factor is a percent of profit to be spent on advertising for the categories of the purchased items.

18. The non-transitory computer-readable storage medium of claim 15 wherein the generating of the bid amount includes multiplying the quotient by a forecast conversion rate.

19. The non-transitory computer-readable storage medium of claim 15 wherein the generating of the bid amount includes multiplying the product by a category-specific forecast conversion rate before aggregating the products.

20. The non-transitory computer-readable storage medium of claim 15 wherein the financial benefit has an associated time and influence of the financial benefit on the generated bid amount decreases over time.

21. The non-transitory computer-readable storage medium of claim 15 wherein the category-specific advertising expense factor is dynamically changed.

22. The non-transitory computer-readable storage medium of claim 15 including generating an advertisement set that includes the keyword, an advertisement, and the generated bid amount.

23. The non-transitory computer-readable storage medium of claim 15 wherein the content is results of a query that includes the keyword.

24. The non-transitory computer-readable storage medium of claim 15 wherein the content is text of a web page that relates to the keyword.

25. A computing system for generating a bid amount, the system comprising:
  a processor; and
  a memory device including instructions that, when executed by the processor, cause the processor to:
    access a data store that includes conversion information for a keyword, the conversion information indicating financial benefit resulting from users selecting advertisements displayed with content that relates to the keyword, the financial benefit being organized into categories relating to sessions initiated by the selecting of the advertisements, a conversion being a session resulting in a financial benefit; and
    calculate the bid amount by determining a category-specific advertising expense factor for the category, accumulating the products for each category of the financial benefit for the keyword for the category multiplied by the category-specific advertising expense factor determined for the category, generating a quotient by dividing the accumulated products by number of conversions for the keyword, and multiplying the quotient by a forecast conversion rate, wherein the forecast conversion rate comprises a predicted percentage of clickthroughs associated with the keyword that results in a conversion.

26. The computing system of claim 25 including a component that combines an advertisement, the keyword, and the calculated bid amount into an advertisement set.

27. The computing system of claim 25 wherein the financial benefit is revenue generated from purchases of items and the category-specific advertising expense factor is a percent of revenue to be spent on advertising for the categories of the purchased items.

28. The computing system of claim 25 wherein the financial benefit is profit generated from purchases of items and the category-specific advertising expense factor is a percent of profit to be spent on advertising for the categories of the purchased items.

29. The computing system of claim 25 wherein the financial benefit has an associated time and influence of the financial benefit on the generated bid amount varies over time.

30. The computing system of claim 25 wherein a category-specific advertising expense factor is dynamically changed.

31. The computing system of claim 25 wherein the content is results of a query that includes the keyword.

32. The computing system of claim 25 wherein the content is text of a web page that relates to the keyword.

* * * * *